United States Patent
Callway

(10) Patent No.: US 6,243,144 B1
(45) Date of Patent: *Jun. 5, 2001

(54) ADAPTIVE FALSE COLOR VIDEO FILTER AND METHOD

(75) Inventor: Edward G. Callway, Toronto (CA)

(73) Assignee: ATI International SRL, Hastings (BB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,191

(22) Filed: Dec. 17, 1998

(51) Int. Cl.$^7$ ...................................................... H04N 9/78
(52) U.S. Cl. ............................ 348/666; 348/667; 348/712
(58) Field of Search ..................................... 348/666, 667, 348/668, 669, 631, 712, 711, 713, 609, 610, 620

(56) References Cited

U.S. PATENT DOCUMENTS

| 4,240,105 | * | 12/1980 | Faroudja ................................. 348/668 |
| 4,617,589 | * | 10/1986 | Weckenbrock ........................ 348/666 |
| 4,731,660 | * | 3/1988 | Faroudje et al. ....................... 348/610 |
| 5,097,322 | * | 3/1992 | Fairhurst ................................ 348/666 |
| 5,663,771 | * | 9/1997 | Raby ...................................... 348/667 |
| 5,841,934 | * | 11/1998 | Chmielewski et al. ................. 386/2 |
| 5,870,153 | * | 2/1999 | Murray et al. ........................ 348/667 |

OTHER PUBLICATIONS

Video Demystified—A Handbook for the Digital Engineer, Keith Jack, pp. 179, 298–301, 1996.

* cited by examiner

Primary Examiner—Reinhard J. Eisenzopf
Assistant Examiner—Trang U. Tran
(74) Attorney, Agent, or Firm—Vedder, Price, Kaufman & Kammholz

(57) ABSTRACT

An adaptive video filter and method utilizes a first filter coupled to receive a composite video signal and generate a filter luminance output signal. An amplitude detector receives the filtered luminance output signal and generates an amplitude level to an amplitude threshold analyzer. The amplitude threshold analyzer has a selectable threshold to provide a selected range of false color filter coefficients to a programmable filter. The programmable filter may be part of a programmable false color filter bank and receives the luminance information and adaptively filters the luminance information based on the selected false color filter coefficients to facilitate false color compensation by attenuating false color frequency components in the filter means information.

13 Claims, 4 Drawing Sheets

ADAPTIVE FALSE COLOR VIDEO FILTER AND METHOD

FIELD OF THE INVENTION

The invention relates generally to systems and methods for compensating against false color from composite video information, and more particularly to systems and methods for compensating against false color occurrences using adaptive filters.

BACKGROUND OF THE INVENTION

It is well known that video encoders typically combine luminance and chrominance information by adding them together. The result is that the chrominance and high frequency luminance signals occupy the same portion of the frequency spectrum. Consequently, video decoders typically use some form of frequency separation filtering to separate the luminance information from the chrominance information in the composite video source information. When some luminance information is decoded as color information, cross color or false coloring conditions can occur.

Many luminance and chrominance separators are known. One type is a two dimensional (2-D) adaptive comb filter. Such separators are typically used because conventional comb filters have problems with diagonal lines and vertical color changes. Typically, with diagonal lines, after luminance and chrominance separation, the chrominance information may also include the difference between adjacent luminance values which may be interpreted by a decoder as chrominance information. The result may be false color artifacts along the edge of a line. A general discussion of an example of two-dimensional adaptive luminance and chrominance separators may be found for example in a book entitled "Video De-Mystified" authored by Keith Jack (1997), pages 294–298. Other examples of various filters may be found on pages 179 and pages 288301.

Conventional 2-D adaptive luminance and chrominance separators typically look at vertical chrominance data over multiple lines and also evaluate for horizontal chrominance information. Such filters are adaptive in that they evaluate if there is a difference between vertical and horizontal chrominance information. However, a problem arises with these separators because these separators typically choose horizontal chrominance information when there is a difference. An additional problem arises if the video image is black and white diagonal luminance information, since the luminance information can still bleed into the chrominance data.

The use of notch filtering is also known to notch out luminance information near the color burst frequency, such as about 3.58 MHz for NTSC video. However, notching out the requisite color burst frequency (hence chrominance information) also notches out luminance information at overlapping frequencies. This can result in distorted images such as a black and white striped shirt appearing gray to an observer.

Video graphic controllers and other video processing devices are known that provide false color filtering in an effort to reduce video display degradation. Video filters may encode signals that are used to send out to television monitors or other monitors such as signals in the format of NTSC or PAL composite video signals. In the digital color space, as known in the art, luminance information may be represented as Y, and color (chrominance) information may be represented as Cb, U, Pb or Y-B and Cr, V, Pr or Y-R, as appropriate. The chrominance information has a frequency spread at about 3.58 MHz. The NTSC and PAL standards use a phase change of the color information from line to line to reduce false coloring. A problem arises when graphics is displayed on a television tuner that normally receives and decodes television signals. Hard edge graphics produce a lot of false coloring to the naked eye. Therefore it is desirable to reduce false color without reducing text legibility excessively. Many television filters mistake the fine detail of text for color images.

Comb filters attempt to see if line to line averaging yields false coloring and if so, lines are blended to reduce false coloring. However, this can result in the loss of resolution and the human eye will perceive blurs along the edges of sharp text. Comb filters typically can remove false color with video signals, however, with text such as the letter "W" the averaging of line to line may produce false color because if the top and bottom of a text character is bounded by a blank line, there may be nothing to average. Other techniques such as "clean encoding" attempt to remove the false color before image information is sent. However, such systems are typically expensive to implement.

Consequently, a need exists for an improved video filter that attempts to adapt to changes in the video information to compensate for false color.

DETAILED DESCRIPTION OF A PREFERRED EMBODIMENT OF THE INVENTION

Briefly, an adaptive video filter and method utilizes a first filter coupled to receive a luminance video signal and generate a filtered luminance output signal. An amplitude detector receives the filtered luminance output signal to determine an amount of false color and generates an amplitude level for an amplitude threshold analyzer. The amplitude threshold analyzer has a selectable threshold to which the amplitude level is compared to select a set of false color filter coefficients for a programmable filter. The programmable filter may be part of a programmable false color filter bank and receives the luminance information and adaptively filters the luminance information based on the selected false color filter coefficients to facilitate false color compensation by attenuating false color frequency components.

In an another embodiment, an additional amplitude detector is inserted as a feedback amplitude detector for the amplitude threshold analyzer. The amplitude threshold analyzer evaluates the multiple amplitude levels to select filter coefficients for the programmable filter to facilitate attenuation of false color frequencies.

Figure 1:
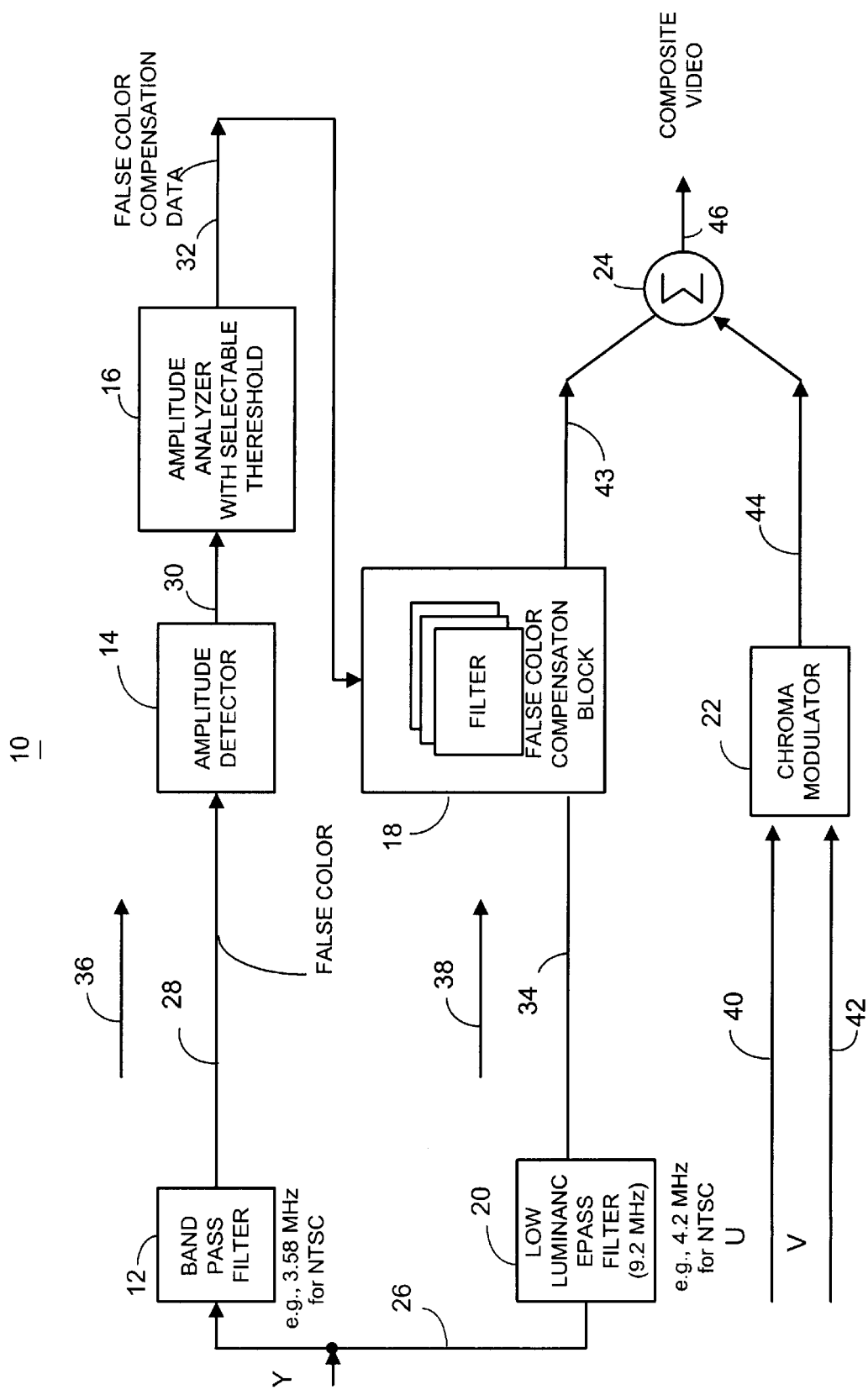
FIG. 1 is a block diagram illustrating one embodiment of an adaptive video filter in accordance with the invention.

FIG. 1 shows an adaptive video filter 10, having a first luminance filter 12, such as a bandpass filter, an amplitude detector 14, an amplitude threshold analyzer 16 with selectable thresholds, a programmable false color filter bank 18, another filter 20, a chrominance modulator 22 and a combiner 24. The first luminance filter 12 receives luminance information 26 and generates a filtered luminance output signal 28. The first filter 12 may be a bandpass filter, for example, with a center frequency at about 3.58 MHz for NTSC video. The amplitude detector 14 receives the filtered luminance output signal 28 and detects the amplitude of the luminance or remaining luminance information. The amplitude detector 14, such as a half wave, full wave or synchronous rectifier, outputs amplitude level signal 30 to the amplitude threshold analyzer 16. The amplitude threshold analyzer 16 takes the amplitude level and compares the level to the thresholds to determine which filter coefficients to select. The amplitude threshold analyzer may be a linear or non-liner analog to digital converter and comparator or any suitable logic or software. For example, as the detected amplitude level signal 30 rises and crosses differing thresholds, a different set of filter coefficients is selected. The amplitude threshold analyzer 16 has multiple thresholds that are selectable through a selectable threshold provider, such as a graphical user interface (gui), which indexes or selects a suitable compensation filter coefficient set for a programmable filter, such as a finite impulse response (FIR) filter. The amplitude threshold analyzer 16 serves as a type of false color filter compensation data provider, that provides data, such as selected false color filter coefficients, for a programmable digital filter. Filter 20 is a low pass luminance filter as required for a typical video encoder, typically 4.2 MHz for NTSC, but may be any suitable low pass luminance filter. filter 20 is a low pass luminance filter as typically required in a video encoder, such as a low pass filter having a center frequency at about 4.2 MHz for NTSC.

The programmable false color filter bank 18 includes, in one example, a plurality of programmable filters with a cut off frequency suitable to filter false color frequencies from the luminance information 26. As such, a first path 36 serves to determine whether false color filtering is necessary and if so, how much. Another path 38 passes standard filtered luminance information 34 to the selected filter in the bank of filters to facilitate false color filtering.

The combiner 24 receives filtered luminance data 43 from a selected filter from the filter bank and combines modulated chroma information 44 from the chroma modulator 22 to produce a composite video signal 46.

The system 10 estimates how much false color is in the luminance signal 26 based on the amplitude of the filtered luminance information 28. The amplitude threshold analyzer 16 switches in the filter from the filter bank to suitably filter false color frequencies from the luminance information. The filter bank 18 may include, for example, an FIR filter programmed as a low pass filter with a 2 MHz cutoff frequency for NTSC video, or a notch filter with a 3.58 MHz center frequency or any other suitable filter or any other suitable frequency.

Figure 2:
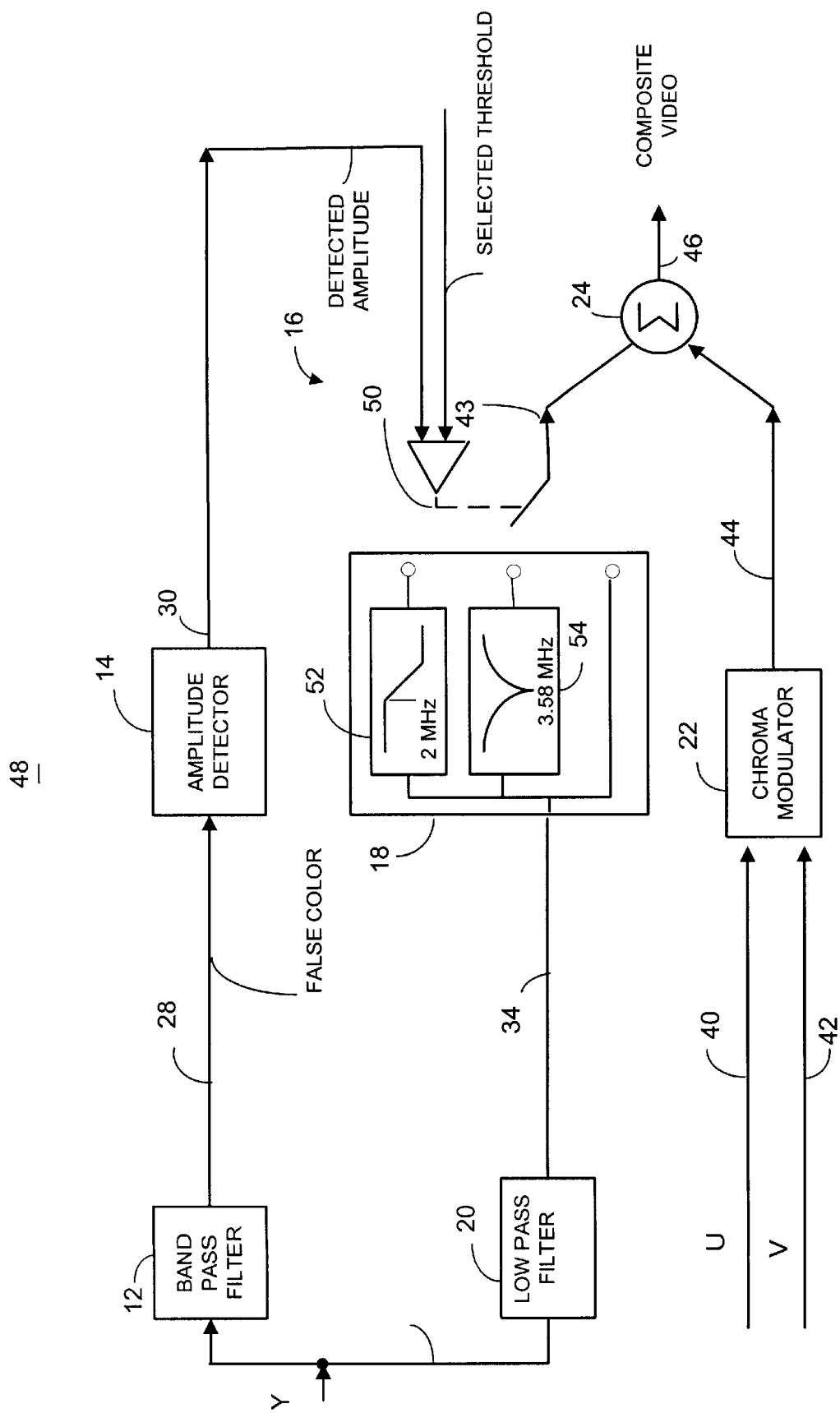
FIG. 2 is a block diagram illustrating another embodiment of an adaptive video filter in accordance with the invention.

FIG. 2 shows an alternative embodiment of the system of FIG. 1 wherein the detected amplitude signal 30 is operatively coupled to an input of a comparator 50 which has a threshold input that is user selectable. In addition, the user can select a type of filter to be applied to the luminance information, such as a low pass filter 52 or a notch filter 54. The adaptive video filter 48 then uses the comparator 50 to switch in an appropriate filter based on the user selectable threshold. For example, if the amplitude detected by the amplitude detector exceeds the threshold set by the user, a notch filter 54 may be switched into filter luminance data 34. If, however, the amplitude detector threshold level 30 is below the threshold set by the user, the adaptive filter bypasses the bank of filters and passes the luminance information to the combiner 24 since an undesirable amount of false color is not likely to occur.

Figure 3:
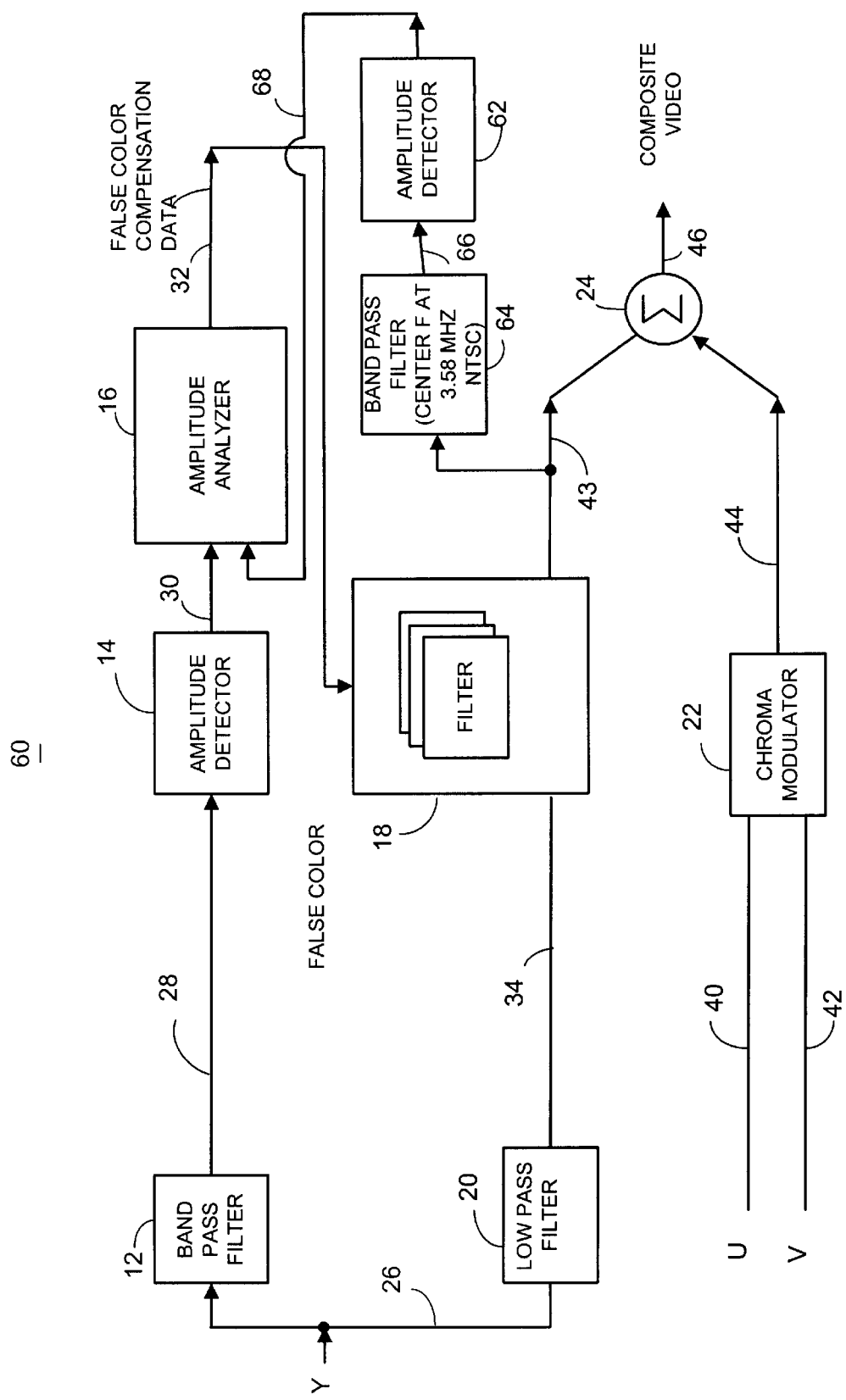
FIG. 3 is one embodiment of an adaptive video filter with closed loop amplitude detection in accordance with the invention.

FIG. 3 shows an alternative embodiment of an adaptive video filter 60 serving as a closed loop encoder. Unlike the adaptive video filters of FIGS. 1 and 2, the adaptive video filter 60 includes a feedback amplitude detector 62 and a feedback filter 64. The feedback filter 64 may be, for example, a band pass filter with a center frequency at about 3.58 MHz in the case of NTSC video similar to the band pass filter 12. The filtered feedback luminance signal 66 is then sampled by the amplitude detector 62. The feedback amplitude detector 62 outputs a second amplitude threshold level signal (e.g., value) 68 to the amplitude threshold analyzer 16. The amplitude threshold analyzer 16 evaluates both amplitude threshold levels to determine a suitable amount of filtering (e.g., whether a certain filter in the bank of filters should be used). The feedback amplitude detector facilitates fine tuning of false color filtering, as the elements 64, 62 and 16 will more closely approximate a model of the actual "annoyance level" of the false color because the second amplitude detector and filter again evaluate the previously filtered signal.

Figure 4:
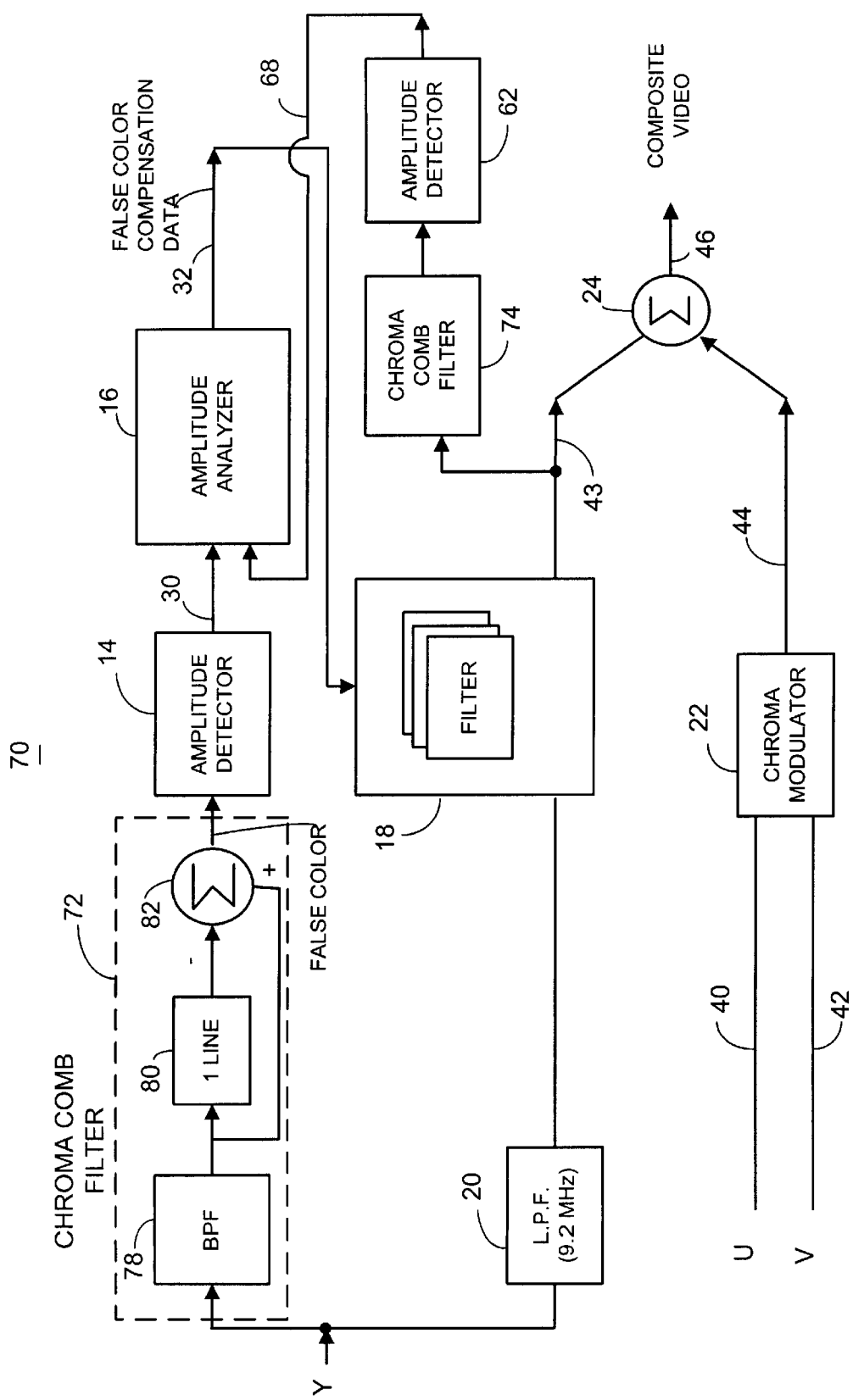
FIG. 4 is another embodiment of an adaptive video filter with closed loop amplitude detection in accordance with the invention.

FIG. 4 shows another embodiment of an adaptive video filter similar to that shown in FIG. 3 except that one or both of the filters 12 and 64 are replaced by chrominance comb filters 72 and 74 respectively. This implementation may be more selective in eliminating false color while not unnecessarily removing high frequency detail. The previous implementation of FIGS. 1–3 may be less selective and filter more luminance detail than necessary.

The chroma comb filter 72 may be any suitable chroma comb filter as known in the art and by way of example is shown to have a band pass filter 78 coupled with a one line delay block 80 and a summer 82 coupled to the one line delay block 80. The summer 82 subtracts luminance information from the one line delay block 80 and outputs an estimate of false color to amplitude detector 14. As shown in dashed lines, extra delay lines may be required to equalize path delays in the system depending upon the number and complexity of additional comb filters as known in the art.

In operation the above-described adaptive video filters receive luminance information from a luminance video signal 26 and generate a filtered luminance output signal 28 therefrom. The adaptive video filters detect a first amplitude level of the output filtered luminance signal 28 and receive by, an amplitude analyzer, selectable amplitude threshold levels. For example, a user may select an amplitude threshold detection level through a graphical user interface. The adaptive video filters provide selected false color filter coefficients based on the selectable amplitude threshold levels. For example, where the amplitude that is detected exceeds a threshold, filter coefficients corresponding to one type of filter are selected, whereas the detected threshold may indicate that a different type of filter may be suitable. As such, different false color filter coefficients are selected. The luminance information is then filtered by a selected programmable filter from a bank of programmable false color filters. This facilitates false color compensation by attenuating false color frequency components in the luminance information.

The adaptive video filters filter the luminance information prior to being passed to the filter in the bank of programmable filters, if desired. The filters then pass pre-filtered luminance information to the programmable false color filter bank. The chrominance modulator modulates chrominance information and the combiner combines filtered luminance data from a selected filter from the filter bank and modulated chrominance information from the chrominance modulator to produce a composite video signal.

Where an additional feedback amplitude detector is used, the amplitude threshold detector analyzer analyzes the detected amplitudes from the first amplitude detector and the second feedback amplitude detector to determine the amount of filtering necessary and hence the filter coefficients for a selected filter in the bank of filters. Each filter in the filter bank may be selected, for example, through a graphical user interface to select the amount of false color attenuation depending upon the application.

The above-identified system facilitates improved false color for composite video signals, in particular for composite video signals containing text based information, although it may be used in any suitable application. It will be recognized that although that the above-identified descriptions refer to digital FIR filters and digital color space, analog color space and the use of analog filters may be used if suitable for the given application. Also, the low pass filters may be part of an encoder or other stage if desired. The above system may be implemented using software, hardware or any suitable combination thereof.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An adaptive video filter comprising:
   a first filter coupled to receive a luminance video signal and generate and output a filtered luminance signal;
   at least one amplitude detector, operatively coupled to receive the filtered luminance signal;
   at least one amplitude threshold analyzer with a selectable threshold provider, operatively coupled to the amplitude detector, that provides selected false color filter coefficients independent of a chrominance level signal; and
   at least one programmable false color filter bank operatively responsive to the selected color filter coefficients and operatively coupled to receive the luminance information that adaptively filters the luminance information to facilitate false color compensation by attenuating false color frequency components in the filter luminance information.

2. The filter of claim 1 including a second filter operatively coupled to filter the luminance information and pass filtered luminance information to the programmable false color filter bank; and a chrominance modulator operatively coupled to receive chrominance information, that modulates chrominance information; and a combiner, operatively coupled to receive filtered luminance data from a selected filter from the filter bank and modulated chroma information from the chroma modulator, to produce a composite video signal.

3. The filter of claim 1 wherein the first filter includes a bandpass filter.

4. The filter of claim 1 wherein the first filter includes a comb filter.

5. The filter of claim 2 wherein the second filter includes a low pass filter.

6. An adaptive video filter comprising:
   a first filter coupled to receive a luminance video signal and generate and output a filtered luminance signal;
   at least one amplitude detector, operatively coupled to receive the filtered luminance signal that provides a first amplitude level;
   at least one amplitude threshold analyzer with a selectable threshold provider, operatively coupled to the amplitude detector, that provides selected false color filter coefficients;
   at least one programmable false color filter bank having a programmable filter operatively responsive to the selected color filter coefficients and operatively coupled to receive the luminance information, that adaptively filters the luminance information to facilitate false color compensation by attenuating false color frequency components in the filter luminance information; and
   a feedback amplitude detector, operatively coupled to receive filtered luminance information from the programmable filter, that outputs a detected second amplitude level to the amplitude threshold analyzer;
   wherein the amplitude threshold analyzer evaluates the first and second amplitude levels to modify filter coefficients for the programmable filter to facilitate attenuation of false color frequencies in the luminance information.

7. The filter of claim 6 including a second filter operatively coupled to filter the luminance information and pass filtered luminance information to the programmable false color filter bank; and a chrominance modulator operatively responsive to chrominance information, that modulates chrominance information; and a combiner, operatively coupled to receive filtered luminance data from a selected filter from the filter bank and modulated chroma information from the chroma modulator, to produce a composite video signal.

8. The filter of claim 6 wherein the first filter includes a bandpass filter.

9. The filter of claim 6 wherein the first filter includes a comb filter.

10. The filter of claim 7 wherein the second filter includes a low pass filter.

11. A method for adaptive video filtering comprising the steps of:
    receiving a composite video signal and generating an output filtered luminance signal therefrom;
    detecting a first amplitude level of the output filtered luminance signal;
    receiving, by an amplitude analyzer, selectable amplitude threshold level independent of a chrominance level signal;
    providing selected false color filter coefficients based on the selectable amplitude threshold level; and
    adaptively filtering the luminance information, by a selected programmable filter from a bank of programmable false color filters, to facilitate false color compensation by attenuating false color frequency components in the luminance information.

12. The method of claim 11 including filtering the luminance information prior to being pass to the filter in the bank of programmable filters, passing filtered luminance information to the programmable false color filter bank; modulating chrominance information; and combining filtered luminance data from a selected filter from the filter bank and modulated chroma information from the chroma modulator, to produce a composite video signal.

13. The method of claim 11 including the step of receiving filtered luminance information from the selected programmable filter and outputting a detected second amplitude level to the amplitude threshold analyzer; wherein the amplitude threshold analyzer evaluates the first and second amplitude levels to modify filter coefficients for the programmable filter to facilitate attenuation of false color frequencies in the luminance information.

* * * * *